United States Patent [19]

Puppe et al.

[11] Patent Number: 4,950,312
[45] Date of Patent: Aug. 21, 1990

[54] SILICA-BOUND CALCIUM-CONTAINING ZEOLITE A GRANULATE

[75] Inventors: Lothar Puppe, Burscheid; Gerhard Reiss, Leverkusen, both of Fed. Rep. of Germany

[73] Assignee: Bayer Aktiengesellschaft, Leverkusen, Fed. Rep. of Germany

[21] Appl. No.: 192,441

[22] Filed: May 11, 1988

[30] Foreign Application Priority Data

Jun. 4, 1987 [DE] Fed. Rep. of Germany ....... 3718673

[51] Int. Cl.⁵ ...................... B01D 53/14; C01B 33/28
[52] U.S. Cl. ............................................ 55/68; 55/75; 423/328; 502/65; 502/407; 502/414
[58] Field of Search .................. 423/328, 329, 330; 502/64, 70, 407, 414, 503, 504, 75, 65; 55/75, 68

[56] References Cited

U.S. PATENT DOCUMENTS

| | | | |
|---|---|---|---|
| 2,882,243 | 4/1959 | Milton | 423/329 |
| 2,908,549 | 10/1959 | Estes | 423/328 |
| 3,055,841 | 9/1962 | Gladrow et al. | 423/329 |
| 3,323,876 | 6/1967 | Arey et al. | 423/329 |
| 3,356,450 | 12/1967 | Heinze | 423/329 |
| 3,394,989 | 7/1968 | Drost | 423/329 |
| 3,769,776 | 11/1973 | Berg | 55/67 |

FOREIGN PATENT DOCUMENTS

| | | | |
|---|---|---|---|
| 0626882 | 9/1961 | Canada | 423/329 |
| 0635899 | 2/1962 | Canada | 423/329 |
| 0170026 | 2/1986 | European Pat. Off. | |
| 1161869 | 1/1964 | Fed. Rep. of Germany | |
| 2524484 | 6/1974 | Fed. Rep. of Germany | 423/328 |
| 3312876 | 10/1984 | Fed. Rep. of Germany | |
| 3413895 | 10/1985 | Fed. Rep. of Germany | |
| 1097860 | 1/1968 | United Kingdom | 423/329 |
| 1124524 | 8/1968 | United Kingdom | 423/328 |

OTHER PUBLICATIONS

G. Reiss, *Chem. Ind.*, XXXV, Nov. 1983, pp. 689–692.
Bauer et al., "New Selective Sorbents: Porous Crystals as Molecular Filters", British Chemical Engineering, May 1959, pp. 267–279.

*Primary Examiner*—Robert L. Stoll
*Assistant Examiner*—R. Bruce Breneman
*Attorney, Agent, or Firm*—Sprung, Horn, Kramer & Woods

[57] ABSTRACT

A $SiO_2$-bound, substantially carbonate-free, calcium-containing zeolite A granulate in which the calcium content is 0.4 to 1 mole CaO/mole $Al_2O_3$ and a process for the production such $SiO_2$-bound calcium exchanged zeolite A granulate in a $CO_2$-free atmosphere at temperatures of 350° C. to 700° C. The $SiO_2$-bound zeolite granulate A being useful as an adsorbent in the recovery of oxygen by the pressure change adsorption process.

5 Claims, 1 Drawing Sheet

SILICA-BOUND CALCIUM-CONTAINING ZEOLITE A GRANULATE

BACKGROUND OF THE INVENTION

1. Field of the Invention

This invention relates to Ca-containing zeolite A for the enrichment of oxygen from air, a zeolitic granulate containing $SiO_2$ as a binder and a zeolite component comprising no $CO_3$ structures at the exchanged calcium cations.

1. BACKGROUND INFORMATION

The specific energy requirement for the production of oxygen by low-temperature air separation increases greatly for small capacities. In relatively small amounts, oxygen may advantageously be obtained by adsorption air separation processes. The purities obtainable are generally lower than those of the oxygen emanating from the low-temperature separation of air. The adsorptive processes operate at ambient temperature. The necessary equipment is often transportable and is distinguished by short start-up times and minimal handling (cf., for example, G. Reiss, Chem. Ind., XXXV/November, 1983).

In processes for adsorptive separation of air into an oxygen-rich phase and a nitrogen-rich phase, use is made of the greater affinity of the nitrogen for adsorption to the adsorbent compared with the oxygen. The $N_2/O_2$ adsorption isotherms show that, for example, Ca zeolite A having a pore diameter of 5 Å adsorbs more nitrogen than oxygen. However, the difference between nitrogen and oxygen is not so great that satisfactory separation of the nitrogen and oxygen in the air appears possible.

The effectiveness of adsorptive air separation can be considerably increased by using a special adsorption process known as pressure change adsorption (PCA). Pressure change adsorption processes are always used when the component to be removed from the crude product gas is present in a relatively high concentration, for example, above 1% by volume, or is inadequately adsorbed to the adsorbent, so that large adsorption units and large quantities of regeneration gas are required for thermal regeneration. In general, the adsorptive separation takes place at a higher pressure than the desorption of the adsorbed components following the adsorption step.

In most cases, desorption is assisted by rinsing of the adsorbent with part of the product gas, for example, in the recovery of nitrogen from combustion gases or drying of gases.

The oxygen enrichment of air occupies a special position in relation to other PCA processes because, in addition to nitrogen, the oxygen and argon in the air are also adsorbed on the molecular sieve zeolites used for this purpose. Accordingly, it is not possible to adsorb only the nitrogen and to recover all the oxygen of the crude product air. Since argon is adsorbed as weakly as oxygen, oxygen purities of 95%, remainder (5%) argon and nitrogen, are obtained in the oxygen enrichment of air.

The oxygen pressure change adsorption process can be divided into three steps:
adsorption with simultaneous recovery of the unadsorbed phase, i.e., oxygen
desorption of the adsorbed phase, in this case nitrogen, carbon dioxide and water of the air, at a pressure below the adsorption pressure, with and without rinsing gas
filling of the adsorber to the adsorption pressure; gas separation may actually take place during this filling process.

All the processes involved take place adiabatically at ambient temperature. Adsorption takes place at a relatively high pressure, while desorption takes place at reduced pressure in the absence of rinsing gas. Refilling is achieved with produced oxygen.

In accordance with the prior art, oxygen PCA plants have the following four principal features:

1. Number of adsorbers

Outwardly, the plants are distinguished by the number of adsorbers to some of which gas holders are connected. In general, the specific energy consumption is lower, the larger the number of adsorbers.

2. Pressure range and cycle time

Major differences exist in the pressure change ranges with the following variants:
adsorption at normal pressure desorption at a reduced pressure of 50–250 mbar
adsorption at an excess pressure of 2–4 bar (abs) desorption at ambient pressure
adsorption at 2–4 bar (abs) desorption at a reduced pressure of 50–500 mbar.

For normal-pressure plants, the cycle time per adsorber is 0.5 to 1.5 minutes and, for excess-pressure systems, from 1 to 3 minutes.

3. Partial step

The key to the effectiveness of the oxygen PCA processes is the filling step after desorption. It is important that as little nitrogen as possible be adsorbed on the adsorption exit side before the adsorption step, because this preadsorbed nitrogen can considerably reduce the quality of the $O_2$ product which is influenced by the filling step or by rinsing with product oxygen. Filling steps may be differentiated as follows:
filling only with product (countercurrent)
filling with product (countercurent) and with air (co-current, at different times or simultaneous)
filling with air (co-current, but only when the adsorption exit side has been rinsed beforehand with $O_2$ product)

4. Pre-drying

The predrying of the air must be satisfactory because a $CO_2/H_2O$ front advancing in the adsorber destroys the $N_2/O_2$ separation.

The pre-purification and $N_2/O_2$ separation take place in the same adsorber, a layer of suitable zeolites or other drying agents being arranged on the air entry side.

As already mentioned, zeolitic molecular sieves are used as adsorbents for $N_2/O_2$ separation by the PCA process. The properties of the zeolite itself can influence the size and energy demand of $O_2$ PCA plants in various ways. Two principal requirements are, on the one hand, high nitrogen adsorption with minimal oxygen adsorption and good diffusion during adsorption and desorption.

To achieve high nitrogen adsorption, calcium-exchanged zeolite A is normally used for PCA plants. Particular importance is attributed to the degree of exchange for $CaO$/mole $Al_2O_3$ in the zeolite A. The degree of exchange in the zeolite may vary from 0 to 1.0 mole $CaO$/mole $Al_2O_3$. The adsorption of $N_2$ in the zeolite increases with increasing degree of exchange for CaO. The degree of exchange is normally 0.4 to 1 mole $CaO$/mole $Al_2O_3$.

For industrial adsorbers, the zeolite is used in granulated form. There are various known processes for the production of granulates. The Ca-exchanged zeolite A powder may be mixed with binders based on clay minerals, such as for example attapulgites, bentonites, sepiolites, kaolinites, ball clays, fireclays or the like, in quantities by weight of 10 to 30% and prefreably 15 to 25% and, after the necessary addition of liquid, the resulting mixtures may be processed into shaped elements in suitable granulating machines such as, for example, roll granulators, extruders, mixing granulators, ring edge-runner presses, extrusion presses or the like. Pan granulators or granulating drums may also be used.

In addition, other binders, such as, for example, $Al_2O_3$, $SiO_2$ or the like, may be used as binders.

Granulating to form beads containing $SiO_2$ as binder is preferably carried out by a process of the type described in DE-OS 3 401 485.

This process gives and $SiO_2$-bound granulate of high macroporosity which is a prerequisite for the use of the granulate in the PCA process.

In addition to the degree of exchange of CaO, the type of activation and the crystallinity of the zeolitic material and also the accessibility of the inner-crystalline adsorption sites are of considerable importance for good oxygen enrichment.

SUMMARY OF THE INVENTION

Now the present invention relates to an $SiO_2$-bound, substantially carbonate free calcium-containing zeolite A granulate in which the calcium content is approximately 0.4 to 1 mole CaO/mole $Al_2O_3$.

The CaO content is preferably more than 0.5 mole CaO/mole $Al_2O_3$.

It has surprisingly been found that, after activation in a $CO_2$-free atmosphere, a Ca-exchanged zeolite A has a particularly high capacity for oxygen enrichment by the PCA process. For comparison with the material according to the invention, Table 1 hereinbelow shows the relative $O_2$ product rates per kg molecular sieve of various zeolite A molecular sieve granulates suitable for oxygen enrichment.

The superiority of the granulate according to the invention is reflected in the fact that, compared with zeolite granulate bound with clay minerals, a 15% better oxygen product rate per kg molecular sieve can be obtained.

The zeolite A granulate according to the invention is produced as follows:

The granulation of zeolite A powder is carried out on a granulation pan using $SiO_2$ as binder by the process according to DE-OS 3 401 485. The granulate is then Ca-exchanged, dried and activated. Activation takes place in a $CO_2$-free gas atmosphere above 350° C. and preferably at 400° to 700° C.

The granulate according to the invention may then be used in the PCA oxygen enrichment process as described in Example 2 hereinbelow.

TABLE 1

Determination of the quantity of Ca-exchanged zeolite A molecular sieve granulates, degree of exchange: 0.75 $CaO/Al_2O_3$

| Example | Binder content 15 weight % | Activation atmosphere | Relative oxygen product rate |
|---|---|---|---|
| 1 | $SiO_2$ | $CO_2$-containing | 100% |
| 3 | $SiO_2$ | $CO_2$-free | 115% |
| 4 | bentonite | $CO_2$-containing | 85% |

TABLE 1-continued

Determination of the quantity of Ca-exchanged zeolite A molecular sieve granulates, degree of exchange: 0.75 $CaO/Al_2O_3$

| Example | Binder content 15 weight % | Activation atmosphere | Relative oxygen product rate |
|---|---|---|---|
| 5 | bentonite | $CO_2$-free | 100% |

DETAILED DESCRIPTION OF THE INVENTION

Figure 1:
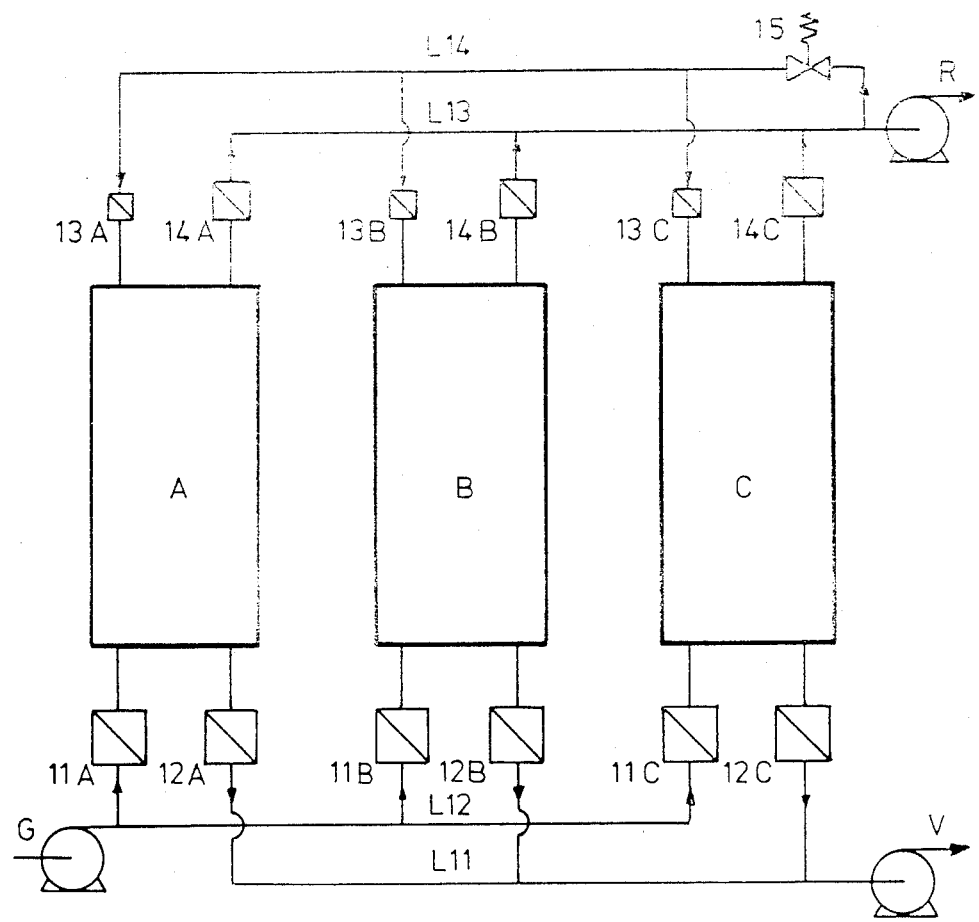
FIG. 1 is a schematic diagram for a standard process for the production of oxygen-enriched air using molecular sieve zeolites (AIChE Symp. 134, Vol. 69, 1973, page 7).

Referring to FIG. 1, on the lowermost side of the absorbers (A, B, C), there are valves (11A, 11B, 11C) or flaps for the entry of crude gas and valves (12A, 12B, 12C) for the exit of the desorbed gas. The absorbent bed consists at its lower end of a protective layer, such as silica gel, for pre-drying of the inflowing crude gas, above which are the main zones with adsorbent for separation of the gas stream. At the upper end of the adsorbers, there are valves (14A, 14B, 14C) for the release of desorptively treated gas. The adsorbers are refilled to the adsorption pressure through further valves (13A, 13B, 13C). This filling process can be controlled by the valve 15 in such a way that a constant increase in pressure or a constant quantity of filling gas is obtained. The blower (G) for the incoming air compensates the pressure loss during adsorption, the adsorption pressure being approximately 1 bar abs.

The production of the granulates according to the invention and their use in a PCA process for the enrichment of oxygen from air are described in the following non-limiting examples.

EXAMPLES

Example 1

Production of the granulate:

30 kg sodium zeolite A having a water content (ignition loss) of 10% by weight were processed into an approximately 0.1 to 0.8 mm diameter granulate in an intensive mixer with addition of 15 1 30% silica sol having a BET value of approximately 300 $m^2/g$. This rough granulate was introduced into a granulation pan.

Finely powdered zeolite A was then continuously introduced into the rotating pan, 30% silica sol being sprayed onto the moving granulate at the same time elsewhere in the pan. A stream of waterglass was added to the silica sol through an injector so that a ratio of sol to waterglass of 10:1 was established. A spherical granulate 2 to 3 mm in diameter was obtained. The moist granulate was dried at 80° C., sieved, subjected to a Ca exchange and then heated to 400° C. in a shaft furnace while air was passed through. The material has an oxygen enrichment which is put at 100% (see Example 2).

FT-IR measurements show that this material comprises carbonate structures. Measurement of oxygen enrichment by the process of adsorption at normal pressure and desorption at reduced pressure.

To illustrate the advantage of the granulates according to the invention, the oxygen enrichment process disclosed, for example, in DE-OS 3 413 895 is described in the following Examples. Prior art granulates and granulates according to the invention are used in this process.

EXAMPLE 2

Oxygen enrichment with the granulate of Example 1

A PCA plant of the type shown in FIG. 1 was used, the total layer height of the absorbers being 2500 mm. 900 kg silica gel were introduced first into each absorber, followed by 5500 kg molecular sieve zeolite 5 A (grain size 2–5 mm). A rotary vacuum pump was used. Oxygen-enriched air was removed from the adsorbers A, B, C and compressed to 1.1 to 1.5 bar (abs) by the compressor (R).

The three adsorbers enabled the process to be carried out continuously with continuous removal of gas at the compressor (R). The following timetable was selected:

Step 1 0 to 70 seconds

Ambient air at 25° C. flows through the blower (G), the pipe L 12, the valve 11 A at a constant pressure of about 1 bar (abs) into the adsorber A, oxygen-enriched air is removed as product by the blower R via the valve 14 A and the pipe L 13. The valves 12 A and 13 A are closed. At the same time, part of the oxygen-enriched air flows from the pipe L 13 through the gas-volume-controlled valve 15, the pipe L 14, the valve 13 B into the adsorber B, the valves 14 B, 11 B and 12 B being closed. As a result, the adsorber B, which before this step had been subjected to desorption, i.e. had been evacuated, was refilled to the adsorption pressure with oxygen-enriched air. To avoid reduced pressure in the adsorber A, for example, in consequence of overrapid product uptake (filling gas) from the pipe L 13, the valve 15 is regulated so that there is a constant flow of product (expressed in Nm³/h) through the pipe L 14, and the valve B into the adsorber E.

During the adsorption step in the adsorber A and during the filling step in the adsorber B, the adsorber C is evacuated by the vacuum pump V via the valve 12 C and the pipe L 11, i.e. the valves 11 C, 13 C, 14 C of the adsorber C are closed. After a desorption time or pumping time of 70 seconds, an Hg manometer ranged between the valves 12 C and the adsorber C indicates a final pressure of 70 mbar.

Step 2 70 to 140 seconds

The adsorber A is evacuated by the vacuum pump (V) via the valve 12 A and the pipe L 11 to a final pressure of (70 mbar, the valves 11 A, 13 A and 14 A being closed. The adsorber B receives air via the blower (G), the pipe L 12 and the valve 11 B, product gas is removed from the adsorber B by the compressor (R) via the valve 14 B and the pipe L 13. The valves 12 B and 13 B are closed. The adsorber C is filled from 70 mbar to an adsorption pressure of approximately 1 bar (abs), oxygen-enriched air passing from the pipe L 13 via the gas-volume-controlled valve 15, the pipe L 14 and the valve 13 C into the adsorber C. The valves 11 C, 12 C and 14 C of the adsorber C are closed.

Step 3 140 to 210 seconds

The adsorber A is brought from its minimal desorption pressure (70 mbar) to the adsorption pressure 1 bar (abs) with oxygen-enriched air from the pipe L 13 via the valve 15, the pipe L 14 and the valve 13 A, the valves 11 A, 12 A and 14 A being closed.

The adsorber B is evacuated from the adsorption pressure to a final pressure of 70 mbar by the vacuum pump (V) via the pipe L 11 and the valve 12 B, the valves 11 B, 13 B and 14 B being closed.

The adsorber C supplies oxygen-enriched air, i.e. ambient air passes via the blower (G), the pipe L 12 and the valve 11 C into the adsorber C, product gas is removed by the compressor (R) via the valve 14 C and pipe L 13, the valves 12 C and 13 C being closed.

The process is repeated after a cycle time of 210 seconds, i.e., adsorber A is in the adsorption phase, the adsorber B is being filled and the adsorber C evacuated.

A product stream of constant oxygen concentration can be obtained via the compressor (R) 0.5 to 1 hour after the beginning of the test.

The product quantity of oxygen-enriched air with an $O_2$ content of 93% obtained in this test is shown in Table 1 by comparison with the various zeolite granulates and is 20 set at 100%.

EXAMPLE 3

Granulate according to the invention

The $SiO_2$-bound granulate was produced in accordance with Comparison Example 1. However, calcination was carried out at 400° C. in a shaft furnace through which $CO_2$-free gas flowed. FT-IR measurements showed that this material comprised very few, if any, carbonate structures.

This granulate showed a 15% higher oxygen enrichment rate compared with the granulate of Example 1.

The oxygen enrichment was carried out by the process described in Example 2.

Example 4

Comparison Example, clay-bound granulate

A clay-ground granulate was activated in an air stream. The oxygen enrichment was carried out by the process described in Example 2. Compared with the granulate of Example 1, this granulate showed a 15% lower oxygen enrichment rate.

Example 5

Comparison Example, clay-bound granulate

A clay-bound granulate was activated in a $CO_2$-free gas stream. The oxygen enrichment was carried out by the process described in Example 2. Compared with the granulate showed a 15% lower oxygen enrichment rate.

It will be appreciated that the instant specification and claims are set forth by way of illustration and not limitation and that various modifications and changes may be made without departing from the spirit and scope of the present invention.

What is claimed is:

1. A $SiO_2$-bound, substantially carbonate-free activated, calcium-containing zeolite A granulate in which the calcium content of the zeolite A is 0.4 to 1 mole $CaO$/mole $Al_2O_3$.

2. A $SiO_2$-bound zeolite according to claim 1, wherein the calcium content is more than 0.5 mole $CaO$/mole $Al_2O_3$.

3. A process for the production of the $SiO_2$-bound zeolite granulate A according to claim 1, comprising activating a $SiO_2$-bound, calcium-exchanged zeolite A in a $CO_2$-free atmosphere at temperatures of 350° C. to 700° C.

4. A process according to claim 3, wherein the temperature is 400° C. to 700° C.

5. In the recovery of oxygen by the pressure change adsorption process, wherein the improvement comprises using a $SiO_2$-bound zeolite A granulate according to claim 1 as the absorbent.

* * * * *